US008612304B1

(12) United States Patent
Lin et al.

(10) Patent No.: US 8,612,304 B1
(45) Date of Patent: Dec. 17, 2013

(54) SELLER TO SELLER TRANSACTIONS

(75) Inventors: Sandi S. Lin, Seattle, WA (US); Thomas Plaster, Bellevue, WA (US); Jason William Vogrinec, Sammamish, WA (US); Stefan M. Haney, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 293 days.

(21) Appl. No.: 13/037,617

(22) Filed: Mar. 1, 2011

(51) Int. Cl.
*G06Q 30/00* (2012.01)
(52) U.S. Cl.
USPC ........................................ 705/26.3; 705/26.1
(58) Field of Classification Search
USPC ............................................... 705/26.1–27.2
See application file for complete search history.

(56) References Cited

U.S. PATENT DOCUMENTS

2006/0259421 A1* 11/2006 Maass .............................. 705/39
2007/0233580 A1* 10/2007 Pike et al. ........................ 705/26

OTHER PUBLICATIONS eBay Outsources Enterprise Marketplaces to Freeflow (eWeek, Dec. 19, 2006).*

* cited by examiner

*Primary Examiner* — Jeffrey A Smith
*Assistant Examiner* — Ethan D Civan
(74) *Attorney, Agent, or Firm* — Thomas | Horstemeyer, LLP

(57) ABSTRACT

Disclosed are various embodiments for facilitating seller to seller transactions. A seller can make products in the seller's inventory available to other sellers. Therefore, other sellers may list a portion of the seller's inventory as their own in-stock inventory. Upon the sale of such a product by another seller, embodiments of the disclosure can facilitate initiating and settling transactions between the sellers and the purchaser as well as fulfillment of the product from the seller's inventory to the purchaser on behalf of another seller.

21 Claims, 5 Drawing Sheets

SELLER TO SELLER TRANSACTIONS

BACKGROUND

Sellers in an electronic commerce system can sell inventory in one or more fulfillment centers to users of the electronic commerce system. Sellers may also sell inventory to other sellers who may have a presence and/or a storefront in the electronic commerce system. Sellers may wish to increase sales by allowing other sellers to sell their inventory. Other sellers may wish to broaden their inventory by offering the inventory of other sellers without taking the inventory risk of stocking certain products themselves.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure facilitate seller to seller transactions in an electronic commerce system. A seller can include a reseller of products, distributor, wholesaler, manufacturer, or any other entity. Additionally, a seller may or may not sell products to retail users. In some embodiments, a first seller can make certain inventory available to be sold by other sellers. Accordingly, other sellers can list the inventory as available, with an embodiment of the disclosure facilitating a seller to seller transaction in the event of a sale of the product by another seller from the inventory of the first seller. Embodiments of the present disclosure also facilitate fulfillment of inventory of a first seller on behalf of a second seller to a purchaser who has consummated a transaction with the second seller. In other embodiments, inventory associated with various sellers can be commingled in one or more fulfillment centers that can be disparately located. Accordingly, inventory can be fulfilled to purchasers via the electronic commerce system according to speed and/or cost concerns, with fulfillment of products on behalf of sellers coming from the commingled inventory. Accordingly, in the following discussion, a general description of one non-limiting example of such a system and its components is provided, followed by a discussion of the operation of the same.

Figure 1:
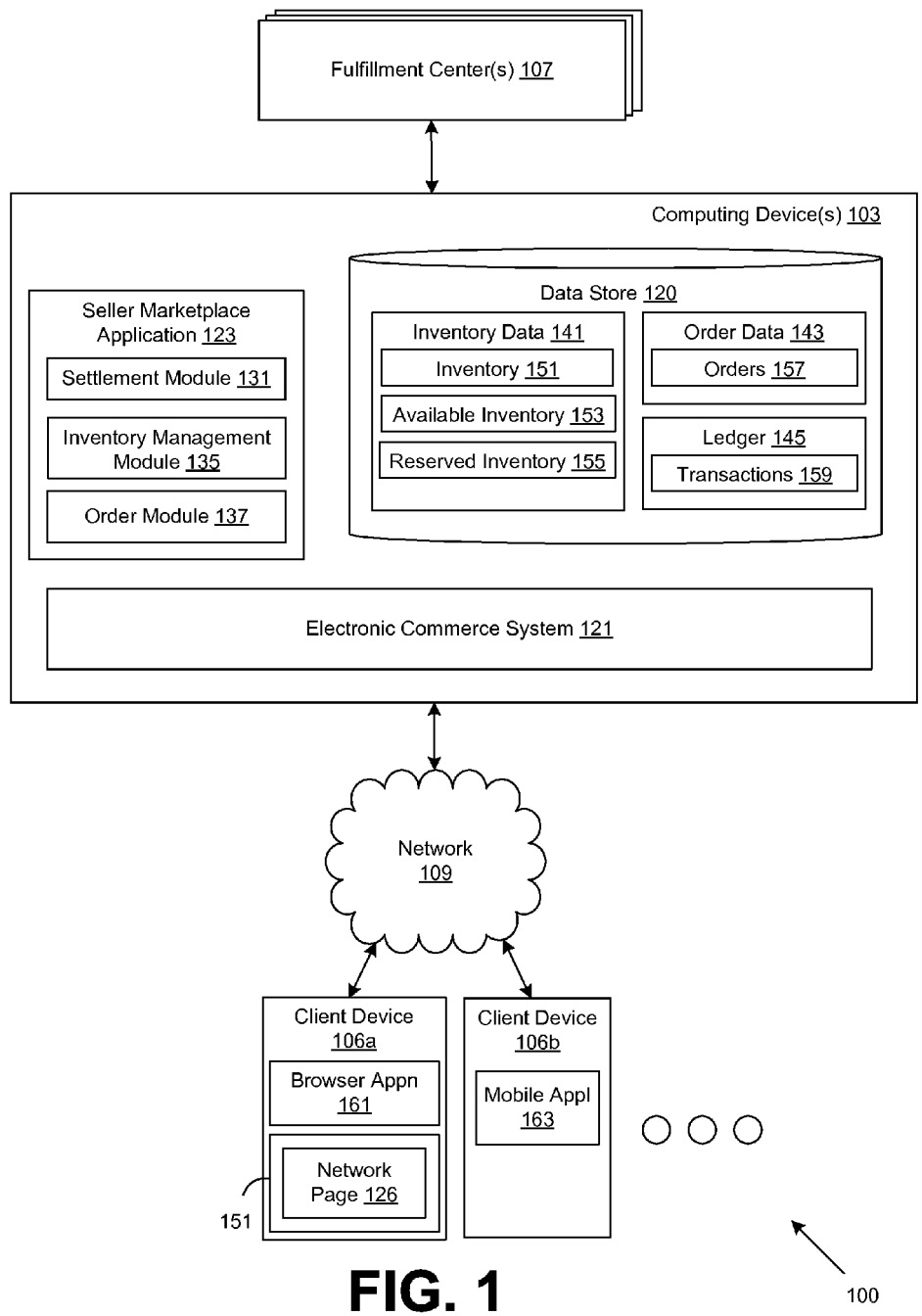
FIG. 1 is a drawing of a networked environment according to various embodiments of the present disclosure.

With reference to FIG. 1, shown is a networked environment 100 according to various embodiments. The networked environment 100 includes at least one computing device 103 that is in communication with at least one client 106 over a network 109. The computing device 103 can also be in communication with one or more fulfillment centers 107 where product inventory associated with sellers in an electronic commerce system can be held and managed. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 120 that is accessible to the computing device 103. The data store 120 may be representative of a plurality of data stores as can be appreciated. The data stored in the data store 120, for example, is associated with the operation of the various applications and/or functional entities described below.

The components executed on the computing device 103, for example, include a seller marketplace application 123, an electronic commerce system 121, and other applications, services, processes, systems, engines, or functionality not discussed in detail herein. The electronic commerce system 121 is executed in order to facilitate the viewing and/or purchasing of items and products over the network 109. Accordingly, the electronic commerce system 121 can allow a seller to set pricing for the various items and products as well as process payments submitted or authorized by users to make purchases. The electronic commerce system 121 can direct the shipment and/or delivery of products to a customer from a fulfillment center or the like. In some embodiments, the electronic commerce system 121 can process an order and transmit order details to a seller for fulfillment of the order.

To this end, the electronic commerce system 121 can facilitate an electronic marketplace in which users can access products made available by sellers on various pricing, payment, and/or shipment terms. A user can browse various products available from various sellers via the electronic commerce system 121, and add products to a virtual shopping cart for later purchase. Various products in a virtual shopping cart can be fulfilled by various sellers and have various shipping terms and prices. The electronic commerce system 121 can access these various products from a product catalog that can be available in the data store 120 or other system in communication with the electronic commerce system 121. The electronic commerce system 121 can, in one embodiment, process payment for items in a virtual shopping cart and forward payment to the various sellers associated with the items purchased by the user. The electronic commerce system 121 also performs various backend functions associated with the online presence of a merchant in order to facilitate the online purchase of items by users in such a marketplace.

For example, the electronic commerce system 121 generates network pages, such as web pages or other types of network content, that are provided to client devices 106a/106b in response to requests for the purposes of selecting items for purchase and to perform other tasks as will be described. In other embodiments, the electronic commerce system 121 facilitates the generating of data for display on a user interface rendered by another type of application executed on a client device 106a/106b. The electronic commerce system 121 can also include other functionality for facilitating online shopping, which is not discussed in detail herein.

The seller marketplace application 123 facilitates seller to seller transactions according to various embodiments of the disclosure. A seller to seller transaction, as is described in further detail herein, can include transactions between sellers involving products in a fulfillment center 107. In one embodiment, a seller to seller transaction can involve one seller buying a quantity of product from an inventory of another seller at a price agreed upon between the sellers. In some embodiments, products in a seller's inventory can be commingled with inventory of other sellers across one or more fulfillment centers. Accordingly, if a first seller buys a quantity of product from a second seller from such a commingled inventory via the seller marketplace application 123, the quantity can be assigned to the first seller's inventory without the need for the second seller to ship the products to the second seller.

A seller to seller transaction can also include a transaction that involves a third party, such as a user of the electronic commerce system 121. In one embodiment, a first seller can, via the seller marketplace application 123, make a quantity of product in the seller's inventory available to other sellers to be sold via the electronic commerce system 121. In this scenario, a second seller can treat such a quantity of inventory as a part of its inventory, and if a user purchases such a product from the second seller, the seller marketplace application 123 will execute a transaction where the first seller sells the product to the second seller, and the second seller sells the product to the user of the electronic commerce system 121. The various functionality of the seller marketplace application 123 will be described in further detail herein.

The data stored in the data store 120 includes, for example, inventory data 141, order data 143, ledger data 145, and potentially other data. Inventory data 141 can include data regarding a seller inventory 151 as well as an available inventory 153 and a reserved inventory 155 associated with the various sellers associated with the electronic commerce system 121. The seller inventory 151 can include data that identifies products in a seller inventory, such as pricing information, various product identifiers, which can include a stock keeping unit, a product name, description, a globally unique identifier and other product information as can be appreciated. The pricing data can vary based upon transaction type. As one example, the pricing data for a product in the seller inventory 151 can include one price for retail transactions to users of the electronic commerce system 121 and a second price for seller to seller transactions to other sellers via the seller marketplace application 123. Pricing can also vary for seller to seller transactions depending on the identity of the sellers involved in the transaction. The seller inventory 151 can also include information about a fulfillment center 107 in which products in a seller's inventory are located.

As noted above, items in a seller inventory 151 can also be commingled with like inventory associated with other sellers. In this sense, certain products in a seller inventory 151 can be treated as fungible so that when a user purchases a product from a seller via the electronic commerce system 121, the fulfillment centers 107 can fulfill the order from any fulfillment center in a fulfillment network without regard to which particular item in the fulfillment center is picked and shipped to the user so long as the fulfillment centers 107 possess an aggregate quantity of the product that is associated with the seller inventory 151. Accordingly, the seller inventory 151 can include information about which products in a seller's inventory are commingled with other sellers' inventory in this way.

Inventory data 141 can also include information about available inventory 153, which describes products in a seller inventory 151 that a particular seller makes available to other sellers to list as if the products were in the inventory of the other sellers. Available inventory 153 can be listed via the electronic commerce system 121 by any seller authorized to do so, and if a particular product is sold to a user by any seller from a particular seller's available inventory 153, the quantity of the product in the available inventory 153 is reduced. The products in a seller's available inventory 153 can be specified by the seller by a product identifier. The available inventory 153 can also include an asking price associated with each product that expresses a price the seller is willing to sell a particular product to another seller in a seller to seller transaction. The data associated with products in the available inventory 153 can also specify limits that a seller can place on the available inventory 153. As some examples, a seller can place a sales velocity limit or a quantity limit on a particular product that is in its available inventory 153. A seller may also place restrictions on which particular fulfillment center in a network of fulfillment centers from which the seller's inventory can be made available to other sellers. For example, a seller may own various quantities of a particular product in various fulfillment centers, but may desire to retain a minimum quantity in a certain fulfillment center or make lots of products in certain fulfillment centers altogether unavailable to other sellers. Accordingly, the seller can place such a restriction in its available inventory 153.

Inventory data 141 can also include information about reserved inventory 155 that is associated with a seller. Reserved inventory 155 describes quantities of one or more products that a seller has reserved from another seller's available inventory 153. If a first seller sells a product in a second seller's available inventory 153, the seller marketplace application 123 can create an inventory reservation that reserves the quantity sold for the first seller. Because multiple sellers may be offering a particular product in their respective available inventories, the seller marketplace application 123 can select one product from an available inventory 153 and generate an entry in the first seller's reserved inventory 155 so that when a product sale to a user is consummated, a seller to seller transaction can be reconciled.

Order data 143 can include information about orders 157 submitted by users of the electronic commerce system 121 for products available via sellers. Additionally, orders 157 can also include bid prices specified by a first seller for a particular product in a product catalog that may be in the available inventory 153 of a second seller. As described above, the available inventory of a seller can specify an asking price associated with a product. Accordingly, the first seller referenced above can specify a bid price that is contingent upon selling a product from the second seller's available inventory to a user of the electronic commerce system 121. Therefore, the first seller can specify an order to purchase the product from the second seller that is contingent in this way.

The data store 120 can also include a ledger 145, which can include accounting information about transactions 159 between sellers via the seller marketplace application 123. The ledger 145 allows the seller marketplace transactions 123 to reconcile accounts of sellers engaging in seller to seller transactions as described herein. The depicted table structure of the data store 120 is one example of how data can be structured therein according to embodiments of this disclosure, as it should be appreciated that data can be structured in many different ways across multiple data stores implemented in various computing devices. As one example, data related to inventory, sellers, users, products, product pricing, shipping terms, etc., can be extracted by the seller marketplace application 123 and/or electronic commerce system 121 by performing queries against data stored in the data store in wholly different table structures. Accordingly, it should be appreciated that the depicted data store 120 and the table structure shown therein is but one example given for ease of depiction and explanation of various embodiments of this disclosure.

Likewise, it should also be appreciated that the particular depiction of an electronic commerce system 121, a seller marketplace application 123 executed in one or more computing devices 103 is but one example of an environment in which an embodiment of the disclosure can be implemented. It should be appreciated that an implementation according to an embodiment of the disclosure can be implemented in various ways, with the functionality described herein implemented in various application structures.

The client 106 is representative of a plurality of client devices that may be coupled to the network 109. The client 106 may comprise, for example, a processor-based system such as a computer system and/or mobile device. Such computer system may be embodied in the form of a desktop computer, a laptop computer, a personal digital assistant, a cellular telephone, set-top box, music players, web pads, tablet computer systems, game consoles, or other devices with like capability. The client 106a may be configured to execute various applications such as a browser 161 and/or other applications. The browser 161 may be executed in a client 106a, for example, to access and render network pages, such as web pages, or other network content served up by the electronic commerce system 121, the seller marketplace application 123 and/or other systems. A client 106b can also be configured to execute a special purpose application, such as a mobile application 163, which may include client side code that renders a user interface that includes data provided by another system.

The fulfillment center 107 may include one or more fulfillment centers that include data processing systems that communicate with the computing device 103 via a communications link. As noted above, the fulfillment centers may be geographically disparate and numerous, but are referred to in this disclosure in the singular. Additionally, certain components to facilitate embodiments of the disclosure may be implemented in one computing device 103, while other components may be implemented in a second computing device 103. The functionality discussed herein as occurring in one computing device 103 (as a non-limiting example) is but one example. For instance, a first computing device may execute software applications or components to facilitate the receiving and processing of orders in an electronic commerce system, while a second computing device may execute software applications or components to facilitate the packaging and fulfillment of orders in a fulfillment center 107.

A fulfillment center 107 may include one or more of, but is not limited to, warehouses, distribution centers, cross-docking facilities, order fulfillment centers, packaging facilities, shipping facilities, or other facilities or combination of facilities for performing one or more functions of material (inventory) handling. Although the fulfillment center 107 is described herein with reference to a fulfillment center and/or inventory warehouse, it is understood that a fulfillment center 107 provides one example of many other types of environments to which the principles described herein apply.

The fulfillment center 107 may comprise, for example, a large warehouse or other structure that includes at least one inventory area where products belonging to sellers are stored. As noted above, inventory can be commingled with the inventory of other sellers. Therefore, in one example, a quantity of commingled inventory in a fulfillment center can be tracked by a product identifier. Accordingly, an aggregate number of products in a commingled inventory can be tracked, with the seller inventory 151 specifying a subset of the aggregate number that is assigned to a particular seller. Therefore, if a seller sells a product from its seller inventory 151 that is also in a commingled inventory in a fulfillment center 107, systems in the fulfillment center 107 can be directed to ship any item from the commingled inventory without needing to locate, pick, and ship a particular item in a fulfillment center 107 that is actually owned by the seller.

Instead, the fulfillment center 107 and its inventory tracking and shipment systems can cause any item in the commingled inventory to be picked and shipped so long as the item is associated with the correct product identifier. The seller marketplace application 123, upon receiving a shipment complete message from a fulfillment center 107 system, can adjust a seller inventory accordingly. In another embodiment, if a first seller purchases a product in a commingled inventory from a second seller, the seller marketplace application 123 can cause the inventory data 141 associated with the first seller and second seller to be updated without the products in a fulfillment center 107 needing to be moved.

Next, a general description of the operation of the seller marketplace application 123 as its various subcomponents is described. As referenced above, the seller marketplace application 123 can facilitate numerous types of seller to seller transactions and functionality. In one embodiment, the seller marketplace application 123 can facilitate the commingling of like inventory across a network of fulfillment centers 107, where the inventory may belong to multiple sellers in the electronic commerce system 121. Accordingly, an inventory management module 135 executed by the seller marketplace application 123 can allow a seller to designate any of its inventory 151 in a fulfillment center 107 as commingled with like inventory of other sellers. Commingled inventory can be housed in multiple fulfillment centers 107 that are in various locations throughout a geographic area.

Upon the sale of inventory that is commingled with like inventory of other sellers via the electronic commerce system 121, the electronic commerce system 121 can transmit an order confirmation and/or a shipment directive to the fulfillment center 107 that identifies the products that requirement shipment to a purchaser. Therefore, because fulfillment centers 107 can be geographically disparate, systems in the fulfillment center 107 can fulfill such an order by selecting the most efficient way to deliver the product to the purchaser, and adjust the seller inventory 151 accordingly. In other words, the fulfillment center 107 can pick and ship a product from commingled inventory by identifying a quantity of the ordered product in a fulfillment center 107 that can most efficiently deliver the product rather than by shipping specific products in a specific fulfillment center that may belong a specific seller.

In another embodiment, a seller to seller transaction can involve a first seller selling a quantity of products in a seller inventory 151 of the first seller to a second seller. In this scenario, a seller can interact with an inventory management module 135 of a seller marketplace application 123 and specify an asking price for a seller to seller transaction in the inventory 151 associated with the seller.

Another seller can then purchase a product from a seller via a seller to seller transaction by interacting with the order module 137. A first seller can place an order for a quantity of a product from a second seller via the order module 137, which can credit an account of second seller and debit an account of the first seller in the ledger 145. If the products purchased in the transaction involve commingled inventory in a fulfillment center 107, the order module 137 can update entries associated with the quantity of the products in the transaction in real time in the seller inventory 151 associated with each seller's inventory data 141. In the context of this disclosure a real time transaction is one that is substantially real time or commercially tolerable in an electronic commerce system. In the event that quantities of products purchased by a first seller from a second seller are not in a commingled inventory in a fulfillment center 107, the order module 137 can communicate with fulfillment center 107 systems so that ownership of the purchased quantity of product is transferred from the first seller to the second seller. In one embodiment, products in a network of fulfillment centers 107 may be individually tracked by a unique identifier. Accordingly, systems in the fulfillment center 107 can receive a request to transfer ownership of a quantity of product belonging to the second seller to the first seller.

The seller marketplace application 123 can also allow a first seller to make quantities of products in its inventory 151 available to other sellers for sale via the electronic commerce system 121 or another electronic marketplace. In one embodiment, other sellers can treat products in another seller's available inventory 153 as if the products are in their own inventory. For example, if a first seller designates that a certain quantity of a product is in its available inventory 153, then a second seller who, for example, has none of the product in its own inventory 151 can treat the available inventory 153 as its own. In other words, the second seller can list the product in an electronic storefront facilitated by the electronic commerce system 121 and seller marketplace application 123 as "in-stock" even though the second seller does not yet own any of the product. As another example, an "in-stock" quantity of the product associated with the second seller can include a quantity of the product in the seller's own inventory as well as the same product that is also in the available inventory 153 of other sellers in the electronic commerce system 121. If or when the second seller sells the product to a purchaser, the seller marketplace application 123 can facilitate a transaction in real time whereby a user purchases the product from the second seller, and the second seller purchases the product from the first seller, and the product is then fulfilled by a fulfillment center 107 from the inventory of the first seller on behalf of the second seller.

To facilitate this functionality, in one embodiment, the inventory management module 135 can allow a seller to designate quantities of at least one product as available inventory 153 that can be sold by other sellers. A first seller can also specify an asking price associated with a seller to seller transaction as described above. The first seller can also specify limitations that can be imposed on designated available inventory. For example, the first seller can limit available inventory 153 to specific sellers and/or disallow certain sellers from selling inventory from the first seller's available inventory 153. The first seller can also limit available inventory 153 by requiring that a certain minimum quantity be retained in its seller inventory 151 that is reserved for the first seller or other specific sellers with which it has a relationship. Additionally, a seller can place sales velocity limits on inventory in available inventory 153. For example, the first seller can limit the amount of inventory that can be sold from available inventory 153 by a quantity over a unit of time. The first seller can also place restrictions on its available inventory 153 according to a particular fulfillment center in which inventory is located, as is described above. In such a scenario where restrictions on a seller's available inventory 153 exist, the seller marketplace application 123 can report that a particular product in the available inventory 153 of a seller is unavailable if such a limit or constraint is violated.

A second seller, via the order module, can specify a bid price at which the second seller is willing to purchase the product from another seller's available inventory. Accordingly, the seller marketplace application 123 and/or electronic commerce system 121 can provide listing capabilities that allow the second seller to list the product in the second seller's electronic storefront and/or via the electronic commerce system 121. These listing capabilities can allow the second seller to specify pricing and/or other limitations and conditions for sales of the product to end users of the electronic commerce system 121. Continuing the above example, if the second seller sells the product to a user of the electronic commerce system 121, the order module 137 can generate a reservation of the ordered quantity of the product which reserves the ordered quantity of the product from the available inventory 153 associated with the first seller or any seller that has made a quantity of the product available. The reservation can ensure that the quantity of the product is not sold by another seller.

Upon completion of the processing of the order by the electronic commerce system 121, the order module 137 can transmit an order confirmation to the fulfillment center 107, which can fulfill the ordered quantity of the product to the purchaser from the available inventory 153 of the first seller on behalf of the second seller. Upon fulfillment and shipment of the ordered quantity of the product from the available inventory 153 of the first seller, the fulfillment center 107 can transmit a fulfillment confirmation and/or shipment complete message to the computing device 103, indicating completion of the order. The settlement module 131 of the seller marketplace application 123 can listen for such a shipment complete message and then facilitate updating the seller inventory 151 and/or available inventory 153 of the first seller, as they have both been depleted by the ordered quantity of the product.

The settlement module 131 can also facilitate updating accounting entries in the ledger 145 to settle the transaction between the first seller and the second seller. Continuing the above example, an account associated with the second seller can be debited and an account associated with the first seller can be credited. The settlement module 131 can also deduct any transaction, fulfillment and/or shipping fees from either account.

Referring next to FIGS. 2-5, shown are flowcharts that provide examples of the operation of a portion of the seller marketplace application 123 according to various embodiments. It is understood that the flowcharts of FIGS. 2-5 provide merely an example of the many different types of functional arrangements that may be employed to implement the operation of the portion of the seller marketplace application 123 as described herein. As an alternative, the flowcharts of FIGS. 2-5 may be viewed as depicting an example of steps of a method implemented in the computing device 103 (FIG. 1) according to one or more embodiments.

Figure 2:
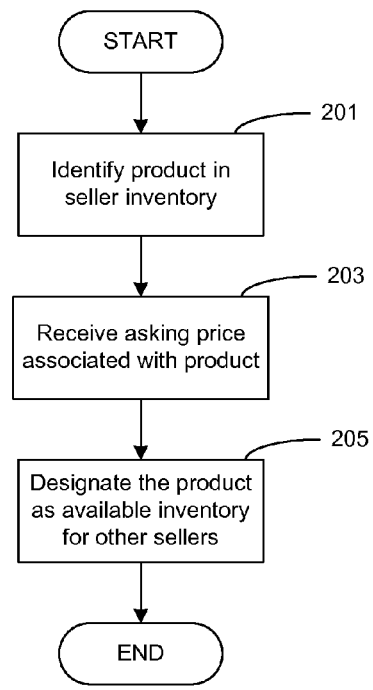
FIGS. 2-5 are flowcharts illustrating one example of functionality implemented as portions of the seller marketplace application executed in a computing device in the networked environment of FIG. 1 according to various embodiments of the present disclosure.

FIG. 2 illustrates one example of the seller marketplace application 123 facilitating the ability of a seller to make inventory available to other sellers. In box 201, the seller marketplace application 123 can identify a product in a seller inventory 151. The product can be identified based on a product identifier, a globally unique identifier, or any identifier that allows the product to be uniquely defined within a product catalog. In box 203, the seller marketplace application 123 can receive an asking price associated with the product that a seller wishes to recover in a seller to seller transaction. As described above, in some embodiments, the seller marketplace application 123 can also allow a seller to place limits on products designated as a part of the seller's available inventory 153. As some examples, a seller can limit items in the seller's available inventory 153 by restricting availability to certain other sellers, sales velocity, or other factors. In box 205, the seller marketplace application 123 can add the product to the available inventory 153 of the seller.

Figure 3:
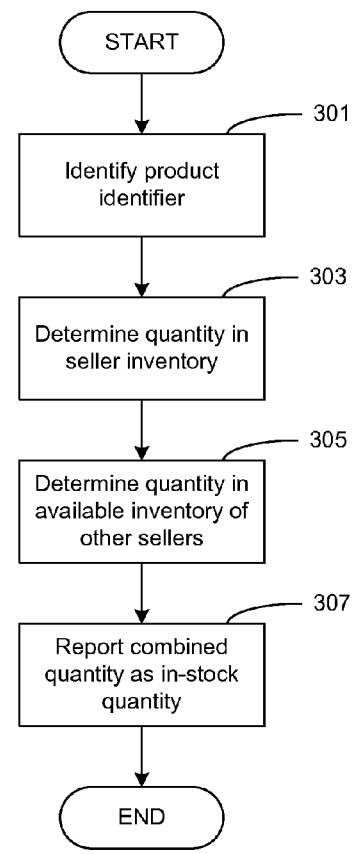

FIG. 3 illustrates one example of the seller marketplace application 123 determining a quantity of a particular product that is available to be sold by a seller via the electronic commerce system 121 or any other electronic marketplace. FIG. 3 depicts an example of making such a determination where the available inventory 153 of other sellers is taken into account. In box 301, the seller marketplace application 123 can identify a product by a product identifier or any identifier that allows the product to be uniquely identified within a product catalog and/or the electronic commerce system 121. In box 303, the seller marketplace application can determine a quantity of the product in the seller inventory 151 associated with the seller. In other words, the seller marketplace application 123 can determine a quantity of the product that is owned by the seller.

In box 305, the seller marketplace application 123 can determine a quantity of the product that is in the available inventory 153 associated with other sellers. To make such a determination, the seller marketplace application 123 can determine whether the seller is authorized to make inventory from another seller's available inventory 153 according to restrictions the other sellers may have specified with regard to seller identity, sales velocity and other potential restrictions. The seller marketplace application 123 can then determine a quantity in the available inventory 153 of other sellers that is available to the seller. In box 307, the seller marketplace application 123 can report the combined quantity of the available inventory 153 of other sellers and the seller inventory 151 of the seller as an in-stock quantity of the seller.

Figure 4:
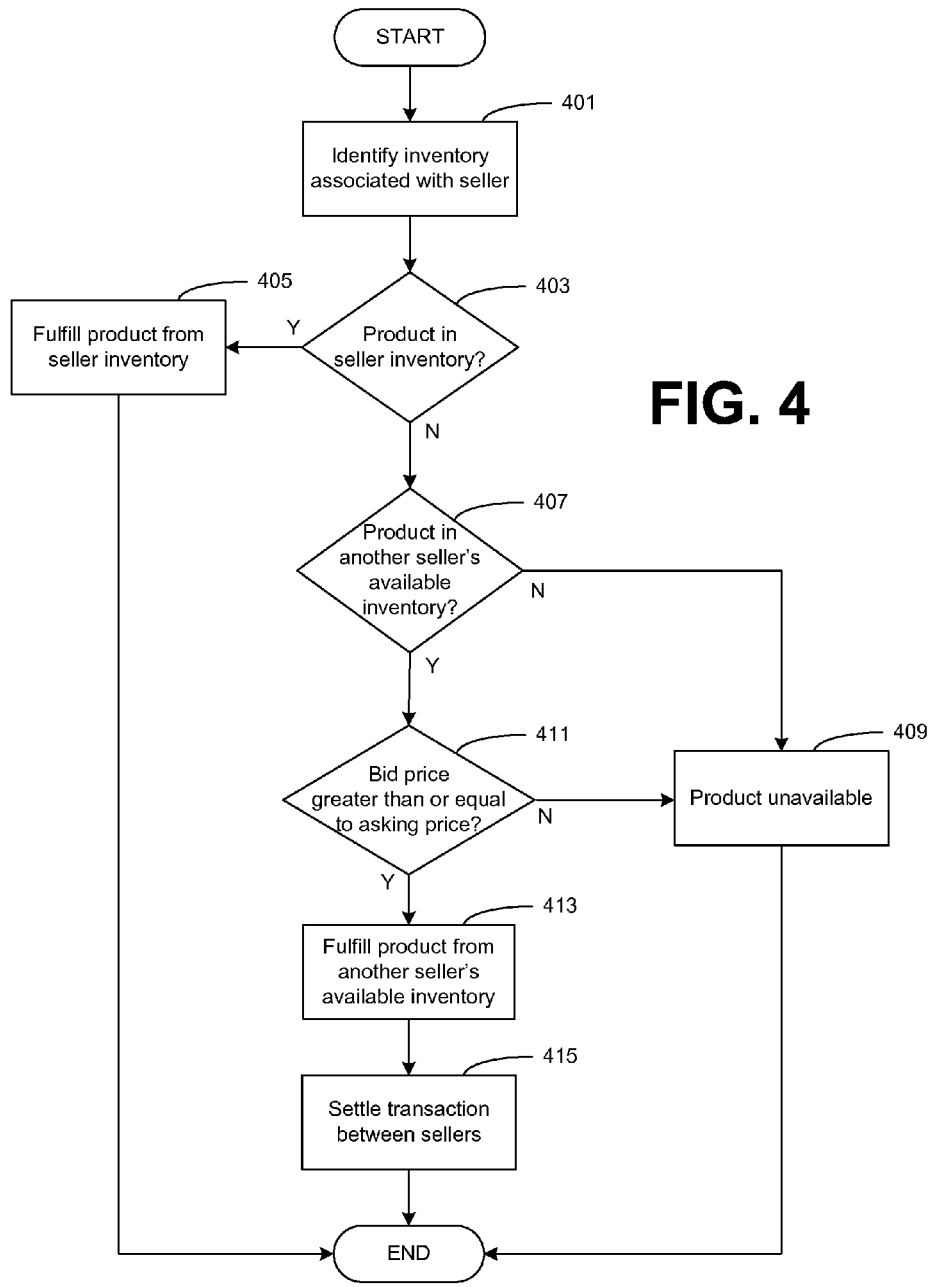

FIG. 4 illustrates an example of the seller marketplace application 123 facilitating, on behalf of a seller, a purchase made by a user of an electronic commerce system 121. FIG. 4 depicts one way in which the seller marketplace application 123 can facilitate fulfillment of an order by leveraging the available inventory of other sellers. In box 401, the seller marketplace application 123 can identify a seller inventory 151 associated with the seller. In box 403, the seller marketplace application 123 can determine whether the seller inventory 151 associated with the seller reflects enough quantity of the product. In box 405, if the seller inventory 151 associated with the seller reflects the ordered quantity, the product can be fulfilled from the seller inventory 151. If the seller inventory 151 associated with the seller does not reflect the ordered quantity, then in box 407 the seller marketplace application 123 determines whether the product is available from at least one other seller's available inventory 153.

If the product is not available in another seller's available inventory 153, then the seller marketplace application 123 can determine that the product is unavailable in box 409. If the product is available in at least one other seller's available inventory 153, then the seller marketplace application 123 in box 411 can determine whether a bid price for the product associated with the seller is at least as great as an asking price specified by another seller in conjunction with the other seller's available inventory 153. If the seller's bid price is great enough, then the product can be fulfilled from at least one other seller's available inventory 153 in box 413. The one or more transactions between sellers can be settled by the seller marketplace application 123 in box 415. As described above, settlement can include crediting the selling seller's account, debiting the buying seller's account and deducting any transaction fees.

In some embodiments, the seller marketplace application 123 can fulfill a partial quantity associated with an order from a seller inventory 151 associated with a seller, with a remainder fulfilled from one or more available inventories 153 associated with other sellers. Additionally, in other embodiments, the seller marketplace application 123 may fulfill an order from the available inventory 153 of at least one other seller even if a seller has a quantity of the product in a seller inventory 151 associated with the seller. As one example, it may be more efficient, cheaper, or otherwise more desirable to fulfill an order by using a quantity of product associated with the available inventory 153 of at least one other seller. For example, a quantity of a product ordered by a user of an electronic commerce system 121 that is associated with another seller's available inventory 153 may be located in a fulfillment center 107 that is in turn located close to the purchaser's shipping address. In this non-limiting example, if all of the seller inventory 151 of the seller is located in a fulfillment center 107 from which shipment of the ordered product would be inefficient, the seller marketplace application 123 can fulfill the product from the available inventory 153 of another seller.

Figure 5:
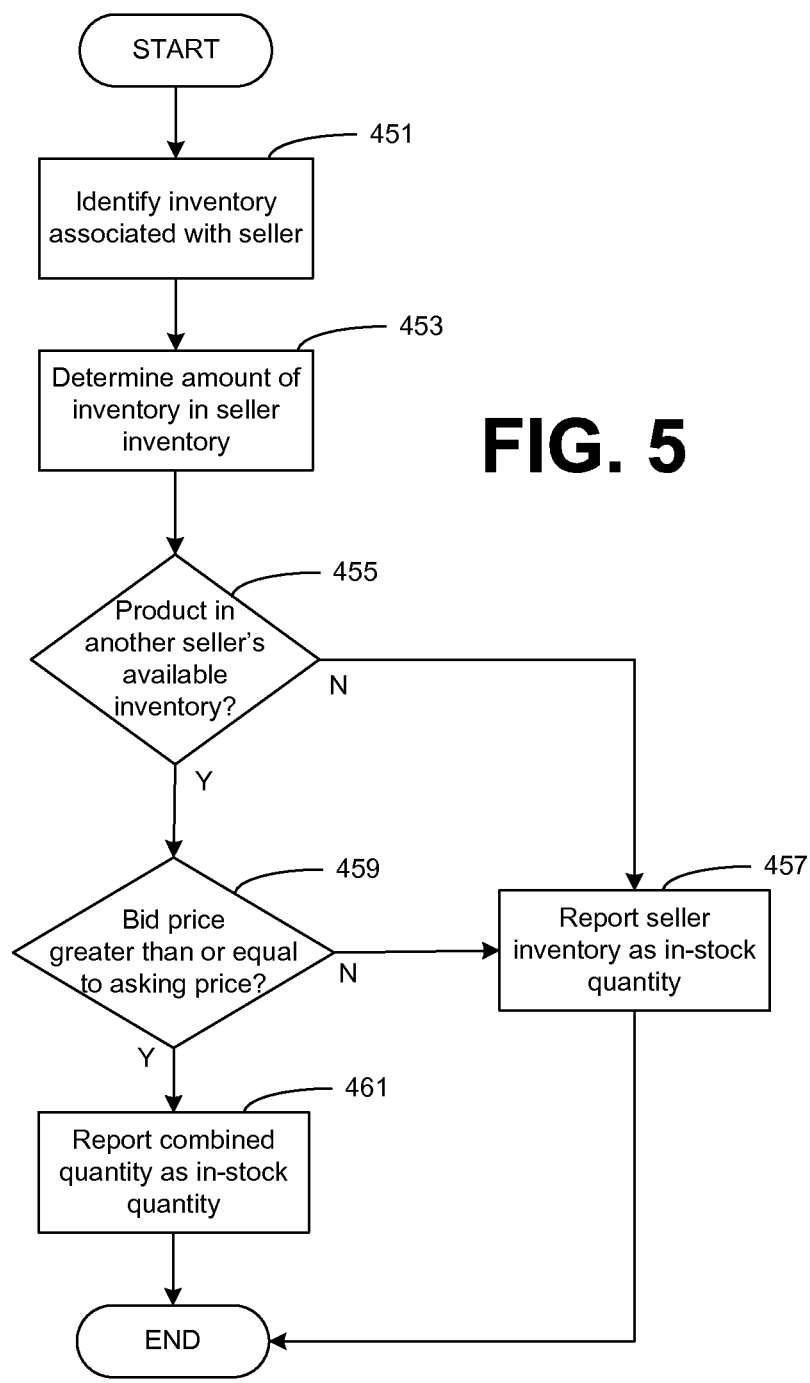

FIG. 5 illustrates an example of the seller marketplace application 123 determining an in-stock quantity of a product associated with a seller that takes into account the seller's own inventory as well as the available inventory of other sellers. In box 451, the seller marketplace application 123 can identify a seller inventory 151 associated with the seller. In box 453, the seller marketplace application 123 can determine a quantity of a whether the seller inventory 151 associated with the seller. In box 455, the seller marketplace application 123 can determine whether the product is listed in the available inventory of other sellers. If it is not, then the seller marketplace application 123 can report the quantity in the seller inventory as the in-stock quantity in box 457.

If the product is in the available inventory of other sellers, the seller marketplace application 123 can determine whether a bid price of the seller is at least as great as the asking price associated with the available inventory of other sellers in box 459. For the quantity of products in the available inventory of other sellers for which a bid price of the seller is as least as great as the asking price, the seller marketplace application 123 can report this quantity of inventory as well as the quantity of inventory in its own seller inventory as an in-stock quantity in box 461.

Figure 6:
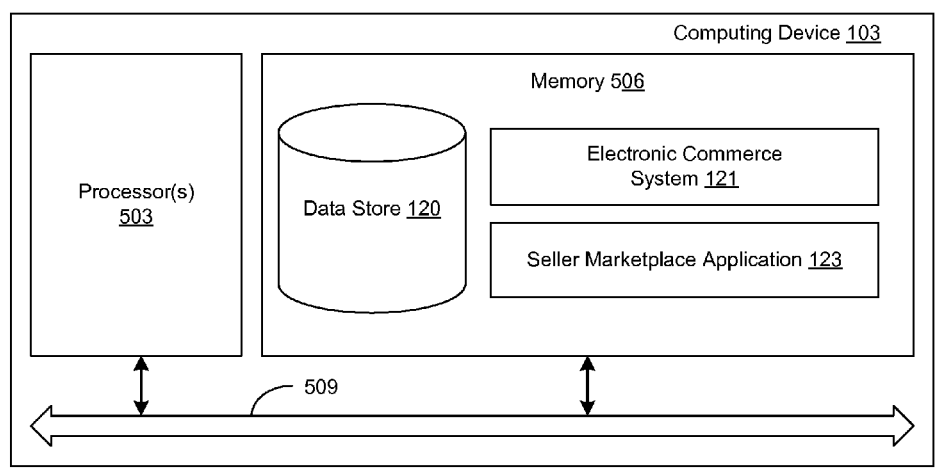
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce system 121, the seller marketplace application 123, and potentially other applications. Also stored in the memory 506 may be a data store 120 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce system 121, seller marketplace application 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-5 show the functionality and operation of an implementation of portions of the seller marketplace application 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-5 show a specific order of execution, it is understood that the order of execution may differ from that which is depicted. For example, the order of execution of two or more blocks may be scrambled relative to the order shown. Also, two or more blocks shown in succession in FIGS. 2-5 may be executed concurrently or with partial concurrence. Further, in some embodiments, one or more of the blocks shown in FIGS. 2-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including in the seller marketplace application 123, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that receives an asking price associated with a product associated with a first seller inventory of a first seller, the first seller offering products via an electronic commerce system to retail users;
   code that designates the product from the first seller inventory as available to be sold by other sellers in the electronic commerce system;
   code that receives a bid price from a second seller, the second seller offering products via the electronic commerce system to retail users and further being different from the first seller, the bid price being associated with the product;
   code that determines whether the bid price is greater than or equal to the asking price;
   code that processes an order from a retail user of the electronic commerce system for the product on behalf of the second seller;
   code the facilitates purchasing of the product from the first seller upon processing of the order on behalf of the second seller when the bid price is greater than or equal to the asking price;
   code that facilitates fulfillment of the product to the user from the first seller inventory to the purchaser on behalf of the second seller;
   code that credits a first account of the first seller by the asking price; and
   code that debits a second account of the second seller by the asking price.

2. A system, comprising:
   at least one computing device; and
   a seller marketplace application executable in the at least one computing device, the seller marketplace application comprising:
      logic that receives a product quantity associated with at least one product identifier associated with at least one product in a fulfillment center, the at least one product quantity and the at least one product associated with a first seller inventory associated with a first seller offering the at least one product to users via an electronic commerce system;
      logic that associates a quantity of the at least one product with the first seller inventory in a data store;
      logic that receives the at least one product identifier associated with an asking price;
      logic that designates the at least one product associated with the at least one product identifier as available to be sold by other sellers in a marketplace;
      logic that processes an order from a user of the electronic commerce system on behalf of a second seller offering the at least one product to users via the electronic commerce system, the order including the at least one product;
      logic that initiates purchasing of the at least one product from the first seller on behalf of the second seller in response to processing of the order from the user on behalf of the second seller; and
      logic that initiates fulfillment of the at least one product to the user from the first seller inventory on behalf of the second seller.

3. The system of claim 2, wherein the at least one product is commingled with an inventory of at least one seller in the at least one fulfillment center.

4. The system of claim 2, wherein the seller marketplace application further comprises logic that associates the quantity of the at least one product with a second seller inventory in the data store.

5. The system of claim 2, wherein the seller marketplace application further comprises logic that calculates an available quantity of the at least one product associated with the second seller by:
   retrieving from the data store an owned quantity of the at least one product associated with the second seller; and
   adding to the owned quantity an available quantity, the available quantity housed in the at least one fulfillment center and owned by at least one other seller.

6. The system of claim 5, wherein the seller marketplace application further comprises logic that receives at least one limitation applied to the available quantity.

7. The system of claim 2, wherein the seller marketplace application further comprises logic that receives at least one bid price from the second seller, the at least one bid price associated with the at least one product associated with the first seller inventory and further expressing a price the second seller is willing to pay for a quantity of the at least one product.

8. The system of claim 2, wherein the logic that initiates purchasing of the at least one product from the first seller on behalf of the second seller further comprises logic that initiates purchasing of the at least one product from the first seller when an inventory of the at least one product associated with the second seller is depleted.

9. The system of claim 2, wherein the logic that facilitates fulfillment of the at least one product from the first seller inventory to the user of the electronic commerce system on behalf of the second seller further comprises:
   logic that generates a reservation for an order quantity of the at least one product in the at least one fulfillment center;
   logic that reduces the first seller inventory by the order quantity;
   logic that initiates shipment of the at least one product to the user of the electronic commerce system; and
   logic that generates a seller to seller transaction between the first seller and the second seller.

10. The system of claim 9, wherein the logic that facilitates fulfillment of the at least one product from the first seller inventory to the user of the electronic commerce system on behalf of the second seller further comprises logic that processes a payment from the user of the electronic commerce system for the at least one product.

11. The system of claim 9, wherein the logic that generates a seller to seller transaction between the first seller and the second seller further comprises:
   logic that listens for a shipment completion message from the at least one fulfillment center; and logic that generates the seller to seller transaction when the shipment completion message is received.

12. The system of claim 9, wherein the logic that generates a seller to seller transaction between the first seller and the at least one other seller further comprises:
   logic that deducts the at least one bid price from a first account associated with the at least one other seller;
   logic that credits the asking price to a second account associated with the first seller;
   logic that applies at least one transaction fee to the transaction by at least one of: deducting the at least one transaction fee from the asking price or adding the at least one transaction fee to the at least one bid price; and
   logic that stores the transaction in the data store.

13. A method, comprising the steps of:
   identifying, in at least one computing device, a quantity of a product associated with a first seller inventory associated with a first seller offering the product to users via an electronic commerce system;
   receiving, in the at least one computing device, an asking price associated with the product;
   designating, in the at least one computing device, the quantity of the product as available to other sellers;
   processing, in the at least one computing device, an order for the product from a user of an electronic commerce system on behalf of a second seller offering the product to users via the electronic commerce system;
   facilitating, in the at least one computing device, fulfillment of the order from the first seller inventory on behalf of the second seller to the user; and
   generating, in the at least one computing device, another order upon processing of the order on behalf of the second seller wherein the second seller purchases the product from the first seller at the asking price.

14. The method of claim 13, further comprising the step of associating the quantity of the product with a second seller inventory of the second seller in a data store.

15. The method of claim 13, further comprising the step of calculating an available quantity of a product associated with the second seller by:
   retrieving from a data store an owned quantity of the product associated with the second seller; and
   adding to the owned quantity an available quantity, the available quantity housed in at least one fulfillment center and owned by the first seller.

16. The method of claim 13, further comprising the step of receiving at least one bid price from the second seller, the at least one bid price associated with a product associated with the first seller inventory and further expressing a price the second seller is willing to pay for the product.

17. The method of claim 13, further comprising the step of receiving a purchasing limitation associated with the product from the first seller, the purchasing limitation being at least one of: a quantity per unit of time limitation, a sales velocity limitation, an identity limitation that identifies at least one seller to whom the product can be sold, or an identity limitation that identifies at least one seller to whom the product cannot be sold.

18. The method of claim 13, wherein the step of facilitating fulfillment of the order from the first seller inventory on behalf of the second seller to the user further comprises the steps of:
   facilitating, in the at least one computing device, fulfillment of the product from the first seller inventory when an inventory of the product associated with the second seller is depleted.

19. The method of claim 13, wherein the step of facilitating fulfillment of the order from the first seller inventory on behalf of the second seller further comprises the steps of:
   generating a reservation for an order quantity of the product in at least one fulfillment center;
   reducing the first seller inventory by the order quantity;
   initiating shipment of the product to the user; and
   generating a seller to seller transaction between the first seller and the second seller, the seller to seller transaction executed at one of the asking price or the at least one bid price.

20. The method of claim 19, wherein the step of generating a seller to seller transaction between the first seller and the second seller further comprises:
   listening, in the at least one computing device, for a shipment completion message from the at least one fulfillment center; and
   generating, in the at least one computing device, the seller to seller transaction when the shipment completion message is received.

21. The method of claim 19, wherein the step of generating a seller to seller transaction between the first seller and the second seller further comprises:
   deducting the at least one bid price from a first account associated with the at least one other seller;
   crediting the asking price to a second account associated with the first seller;
   applying at least one transaction fee to the transaction by at least one of: deducting the at least one transaction fee from the asking price or adding the at least one transaction fee to the at least one bid price; and
   storing the transaction in a data store.

* * * * *

UNITED STATES PATENT AND TRADEMARK OFFICE
CERTIFICATE OF CORRECTION

| | |
|---|---|
| PATENT NO. | : 8,612,304 B1 |
| APPLICATION NO. | : 13/037617 |
| DATED | : December 17, 2013 |
| INVENTOR(S) | : Sandi S. Lin et al. |

It is certified that error appears in the above-identified patent and that said Letters Patent is hereby corrected as shown below:

In the Claims:

Claim 1, Column 13, line 36, delete the word "the" and insert the word --that--, to read as follows:

-- code that facilitates purchasing of the product from the first --

Signed and Sealed this
Nineteenth Day of August, 2014

Michelle K. Lee
*Deputy Director of the United States Patent and Trademark Office*